F. ZIMA.
HOE.
APPLICATION FILED NOV. 16, 1914.
1,157,356. Patented Oct. 19, 1915.
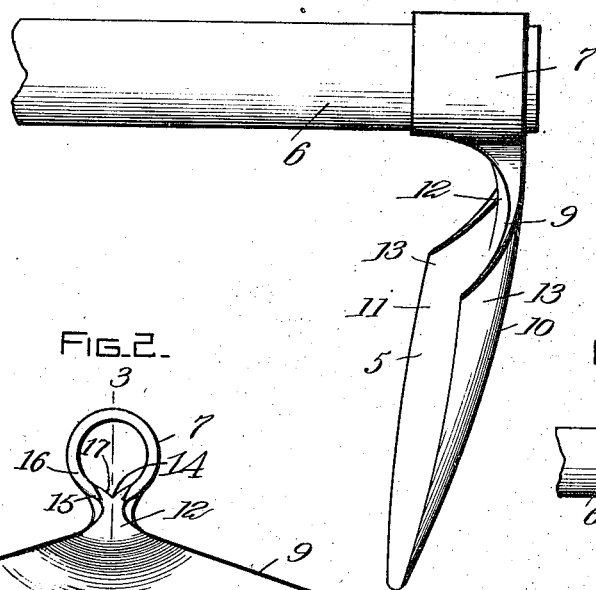
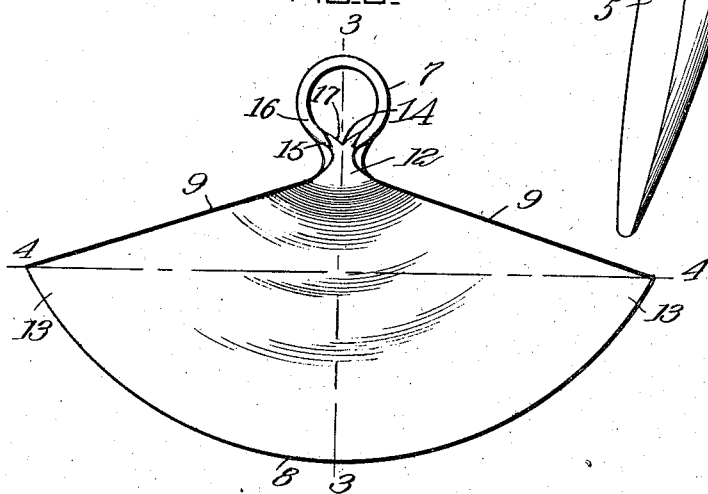
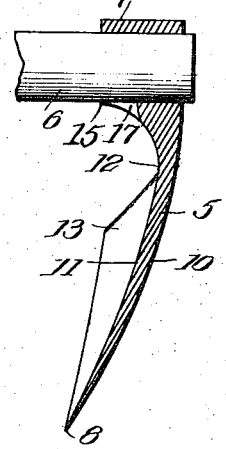
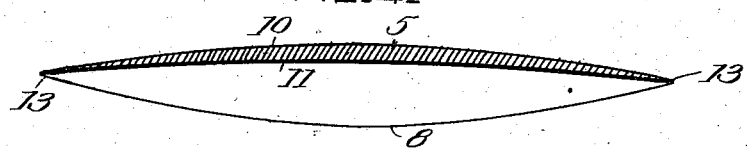
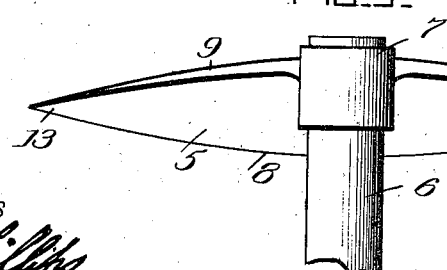
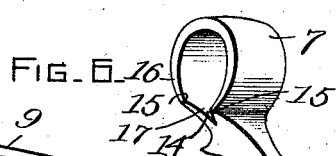
WITNESSES
INVENTOR
Frank Zima
BY
ATTORNEYS

UNITED STATES PATENT OFFICE.

FRANK ZIMA, OF HUMPHREY, NEBRASKA.

HOE.

1,157,356.  Specification of Letters Patent.  Patented Oct. 19, 1915.

Application filed November 16, 1914. Serial No. 872,370.

*To all whom it may concern:*

Be it known that I, FRANK ZIMA, a subject of the Emperor of Austria-Hungary, residing at Humphrey, in the county of Platte and State of Nebraska, have invented certain new and useful Improvements in Hoes, of which the following is a specification.

This invention relates to gardening implements and more particularly to an improved hoe.

One of the principal objects of my invention is to provide an improved hoe especially adapted for the weeding and cultivation of closely planted vegetables such as sugar beets, etc.

Another object of the invention is to provide an improved hoe having a blade substantially in the form of a sector having a curved cutting edge adapted for general use in weeding and cultivating and having working points formed by the angular disposition of the rear or back edges of the hoe with the cutting edge, these points being particularly adapted for use in breaking hard ground and in weeding closely planted vegetables without injury to the latter.

A further object of the invention is to provide a hoe of the class described which may be used equally well by a right or by a left handed person and which is readily adapted for the utilization of the cutting edge or either working point without necessitating reversal of the hoe.

A still further object is to provide a hoe having a handle socket provided with a cutaway portion defining points or edges which may be struck by a suitable instrument to embed them in the wooden handle of the hoe for preventing loss or loosening of the hoe blade from the handle.

Still another object of the invention is to provide a hoe which will be extremely simple, durable, efficient in operation and inexpensive to manufacture, and which possesses the additional advantages of being self sharpening and cleaning.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a perspective view of a hoe constructed according to my invention. Fig. 2 represents a plan view thereof looking toward the concaved side of the hoe. Fig. 3 represents a vertical transverse sectional view taken on the plane indicated by the line 3—3 of Fig. 2. Fig. 4 represents a longitudinal sectional view taken on the plane indicated by the line 4—4 of Fig. 2. Fig. 5 represents a view of the hoe looking at the same from the upper or back edge thereof, and Fig. 6 represents a perspective view of the handle socket.

Referring more particularly to the drawing, the hoe comprises a blade 5, handle 6, and a socket 7 formed integrally with the blade.

As indicated in Fig. 2 the blade is in the general form of a sector, and is provided with an arcuate or curved sharp cutting edge 8, and the back edges 9, disposed at an obtuse angle to each other, and converging from the ends of the cutting edge to a point above the center thereof, at which point, which may be termed the apex of the blade, the socket 7 is formed. As clearly indicated in Figs. 3 and 4 the blade is of a concavo-convex formation both laterally and longitudinally, the rear side or face 10 of the blade being convexed while the front side or face 11 thereof is concaved. At its apex 12 the blade is comparatively thick and heavy, and tapers off both longitudinally along the back edges 9 and transversely of the blade along the broken line 3—3 of Fig. 2, as indicated in Figs. 4 and 3 respectively, so that the heaviest portion of the blade occurs at the apex thereof and from this point the blade gradually and uniformly tapers in all directions. The socket 7 is formed integrally with the blade and is connected substantially directly to the blade. This construction eliminates the usual shank or goose neck, and renders the implement particularly strong and free from vibration while it is in use. The gradual tapering of the blade from its apex to its edges also tends to eliminate the vibration usually found in hoes of this general character.

The cutting edge 8 is sharpened throughout its entire length, and the back edges 9 are not sharp but are rounded off so as to be free from any sharp edges, and the working points 13 formed at the ends of the cutting edge by the angular disposition of edges 9 with said cutting edge, are particularly adapted for use in weeding and cultivating closely planted vegetables. This particular and advantageous utilization resides in the fact that by reason of the back edges 9 being rounded and forming one angle or leg of the working points, leaves and stalks or roots of the vegetables will not be cut or abraded while the sharp edge forming the other leg of the point is being used in chopping or cutting the weeds.

The rounded or arcuate cutting edge 8 presents advantages in the fact that a longer cutting edge is obtained than would be the case if the edge were straight, and furthermore the thrust occurring at any point in the cutting edge will be directed to the thickened portion or apex of the hoe blade. There will thus be a decided less danger of breakage than would be the case were the hoe blade straight. The hoe may be used to equal advantage by right handed or by a left handed person, and as will be understood either the cutting edge 8 or the working points 13 may be brought into play by slightly twisting the hoe or by slightly changing the direction of the stroke, thus doing away with the necessity of reversing the hoe, which latter is a great disadvantage accruing to those hoes having working edges for different uses, on opposite sides of the handle.

By reason of the concavo-convex formation of the hoe blade, the working edge 8 thereof will automatically remain sharp as the blade gradually wears away, and this peculiar formation will also render the hoe substantially self cleaning, since there will be less liability of earth becoming clogged upon the faces of the hoe blade.

The handle socket 7 is provided on its under side with a substantially V-shaped cut-away portion 14 defining points 15 at the apexes formed by the meeting of the front edge 16 of the socket and the edges 17 of the cut-away portion 14. These points are relatively thin as indicated, and by striking the points or adjacent portions of the socket with a heavy instrument at any time, the metal may be partially embedded in the handle of the hoe, to prevent loosening or loss of the hoe from the handle.

Although I have described the preferred embodiment of my invention, I may desire to make such changes in the construction, combination and arrangement of parts thereof as do not depart from the spirit of the invention and the scope of the appended claims.

I claim:—

1. In a hoe, a sector shaped blade having a sharpened arcuate cutting edge, and having dull back edges disposed at an obtuse angle to each other, said back edges being disposed at an acute angle to the cutting edge for forming working points, said blade being thicker at its apex and gradually tapering in all directions toward said cutting edge, and a handle socket formed directly upon said blade at the apex of the latter.

2. In a hoe, a substantially sector shaped blade, said blade having an arcuate sharpened cutting edge, and having substantially straight dulled back edges disposed at an obtuse angle to each other and at an acute angle to said cutting edge, whereby to form working points at the junction of the back edges with said cutting edges, said blade being of a concavo-convex formation both longitudinally and transversely, and a handle socket formed at the apex of the blade.

3. In a hoe, a blade of concavo-convex formation longitudinally and transversely, having a curved and sharpened cutting edge defined at the edge of the thinnest portion and having back edges angularly disposed with relation to the cutting edge, working points defined at the junction of the back and cutting edges, and means whereby a handle may be connected with the blade.

FRANK ZIMA.

Witnesses:
W. M. CONDEN,
M. E. OTTIS.